United States Patent
Yang et al.

(10) Patent No.: US 12,098,840 B2
(45) Date of Patent: Sep. 24, 2024

(54) LIGHT DIFFUSION PLATE AND METHOD FOR MANUFACTURING THE SAME

(71) Applicant: Entire Technology Co., Ltd., Taoyuan (TW)

(72) Inventors: Chih-Wen Yang, Taoyuan (TW); Chia-Yin Yao, Taoyuan (TW); Mao-Hsing Lin, Taoyuan (TW); Tsung-Han Lee, Taoyuan (TW)

(73) Assignee: Entire Technology Co., Ltd., Taoyuan (TW)

( * ) Notice: Subject to any disclaimer, the term of this patent is extended or adjusted under 35 U.S.C. 154(b) by 397 days.

(21) Appl. No.: 17/391,822

(22) Filed: Aug. 2, 2021

(65) Prior Publication Data
US 2022/0049836 A1 Feb. 17, 2022

(30) Foreign Application Priority Data
Aug. 12, 2020 (TW) .................. 109127413

(51) Int. Cl.
*B29D 11/00* (2006.01)
*B29B 7/14* (2006.01)
(Continued)

(52) U.S. Cl.
CPC .............. *F21V 9/30* (2018.02); *B29B 7/14* (2013.01); *B29C 44/50* (2013.01); *B29C 48/0012* (2019.02); *B29C 48/0019* (2019.02); *B29C 48/07* (2019.02); *B29C 48/35* (2019.02); *B29C 48/87* (2019.02); *B29C 48/914* (2019.02); *B29C 48/92* (2019.02); *B29D 7/01* (2013.01); *B29D 11/00798* (2013.01); *C08L 69/00* (2013.01); *G02B 5/0242* (2013.01); *G02B 5/0278* (2013.01); *B29C 2948/92704* (2019.02); *B29C 2948/92904* (2019.02); *B29K 2069/00* (2013.01); *B29K 2105/0032* (2013.01); *B29K 2105/04* (2013.01); *C09K 11/06* (2013.01); *C09K 11/08* (2013.01); *F21Y 2115/10* (2016.08)

(58) Field of Classification Search
CPC ...... B29C 48/0012; B29C 48/07; B29C 48/08; B29C 48/18; B29C 48/21; B29C 48/305; B29C 48/307; B29C 48/49; B29C 48/87; B29C 48/914; B29D 7/01; B29D 11/00798
See application file for complete search history.

(56) References Cited

FOREIGN PATENT DOCUMENTS

| CN | 114675356 A | * | 6/2022 |
| CN | 114750492 A | * | 7/2022 |

* cited by examiner

*Primary Examiner* — Xiao S Zhao
*Assistant Examiner* — Joseph S Leyson (57) ABSTRACT

A light diffusion plate is configured to be assembled with a blue light source module having blue Mini LEDs to form a white light backlight module. The light diffusion plate is added with organic dyes with light-emission wavelength of 490-650 nm in order to convert the blue light into white light. The light diffusion plate is made by a foaming extrusion process and contains a plurality of micro-bubbles with a size of 60-400 μm and a weight-reduction ratio of 15-25% for improving the uniformity of white light and resolving the MURA problem. The size of micro-bubbles is controlled by reducing the temperature of at the exit end of the T-die head, such that the wavelength of the white light emitted from the light diffusion plate can be narrower to achieve the effect of wider color gamut display.

6 Claims, 5 Drawing Sheets (51) Int. Cl.
  *B29C 44/50* (2006.01)
  *B29C 48/00* (2019.01)
  *B29C 48/07* (2019.01)
  *B29C 48/35* (2019.01)
  *B29C 48/87* (2019.01)
  *B29C 48/88* (2019.01)
  *B29C 48/92* (2019.01)
  *B29D 7/01* (2006.01)
  *C08L 69/00* (2006.01)
  *F21V 9/30* (2018.01)
  *G02B 5/02* (2006.01)
  *B29K 69/00* (2006.01)
  *B29K 105/00* (2006.01)
  *B29K 105/04* (2006.01)
  *C09K 11/06* (2006.01)
  *C09K 11/08* (2006.01)
  *F21Y 115/10* (2016.01)

LIGHT DIFFUSION PLATE AND METHOD FOR MANUFACTURING THE SAME

This application claims the benefit of Taiwan Patent Application Serial No. 109127413 filed Aug. 12, 2020, the subject matter of which is incorporated herein by reference.

BACKGROUND OF INVENTION

1. Field of the Invention

This invention refers to a light diffusion plate and a method for manufacturing the same, especially refers to a light diffusion plate that can be assembled with a blue light source module containing a plurality of blue sub-millimeter light emitting diodes (blue Mini LEDs) to form a white light backlight module, and its manufacturing method.

2. Description of the Prior Art

Mini LED is the abbreviation of "mini light emitting diode", which generally means an LED with a grain size of about 100-200 microns (μm). Because the grain size of Micro LED (micro light emitting diode) is below 50 μm, there are still technical obstacles such as high manufacturing cost and difficult massive transfer. Therefore, the development of Mini LED with relatively mature manufacturing technology is popular in the art.

The grain size and required technology of Mini LED are between traditional LEDs and Micro LEDs. Compared with Micro LEDs, Mini LED has a higher production yield rate in the manufacturing process. It has special-shaped profiling cutting characteristics. It can also be used with a flexible substrate to achieve a high-curved backlight module. Mini LED backlight module can adopt local dimming design, has better color rendering effect, and can bring liquid crystal display panel (LCD Panel) finer high-dynamic range (HDR) partition, and the thickness is also close to the organic light-emitting diode (OLED). It can save power up to 80%, so it is demanded for backlight applications such as power saving, thinning, HDR, and special-shaped displays. In the LCD displays using the backlight module as the light source, because Mini LEDs have the advantages of high brightness, high contrast and high display effect, in addition, the cost of Mini LED backlight module using the blue Mini LED chips as the basic light source is lower than the cost of Mini LED backlight module using three primary colors of RGB as the light source; therefore, the backlight module composed of blue Mini LEDs is cheaper in cost, and is more suitable for the backlight module of mobile phones, tablet computers, desktop displays, TVs, car display panels and gaming laptops.

The traditional white light LED backlight module is packaged by applying phosphor glue directly on the upper surface of the LED chip. After the phosphor is mixed with glue, it will precipitate, so that the color temperature is unevenly dispersed and cannot be concentrated. In addition, the phosphor directly contacts the top surface of the LED chip, which is prone to problems such as excessive heat generation, poor phosphor heat dissipation, and reduced efficiency. Another conventional technology is to generate white light by adding a quantum dot film on the light diffusion plate of the backlight module composed of the blue LED module. The basic principle of such conventional technology is to combine the blue LED chip and the green light and red light quantum dots in the film in order to generate the white light. The advantages of this conventional technology include wide color gamut display, more accurate color control, and the quantum dots are inorganic materials with good stability; however, the disadvantages are that the quantum dot film is expensive and the cadmium used in its preparation process is toxic. If it is not handled properly, it will cause water and soil environmental pollutions. Therefore, the conventional technologies for applying Mini LEDs to white light backlight modules still have their own shortcomings and need to be further improved.

SUMMARY OF THE INVENTION

The primary objective of the present invention is to provide a light diffusion plate for use with blue Mini LEDs, which directly adds organic dyes in the extrusion process of the light diffusion plate to uniformly disperse the organic dyes in the plastic material for converting the blue light emitted by blue Mini LEDs into white light, so as to achieve uniform dispersion and consistent color temperature thickness. In addition, the resin material of the light diffusion plate has high temperature resistance and better mechanical properties, which can extend the lifetime of the light extraction efficiency of organic dyes, and is not affected by the heat emitted by the chips. Moreover, the light diffusion plate is manufactured by a foaming extrusion process, and a large number of micro-bubbles are mixed into the plastic material of the light diffusion plate to make the light output more uniform. By controlling the size of the micro-bubbles for light splitting, the light wavelength can be narrowed to achieve a wider color gamut.

Another objective of the present invention is to provide a method for manufacturing a light diffusion plate for use with blue Mini LEDs. By adding a nucleating agent in the foaming extrusion process of the light diffusion plate and uniformly mixing and foaming with an extrusion screw section, the temperature of the front stage is lowered by around 20-30° C. at the exit end of a T-die in order to achieve the effect of cooling and condensing the bubbles, thereby controlling the size of the micro-bubbles.

In order to achieve aforementioned objectives, the present invention provides a light diffusion plate that is capable of being assembled with a blue light source module and converting blue light into white light. The light diffusion plate comprises: a plastic substrate, at least one light-color conversion material, and a plurality of micro-bubbles. The plastic substrate has a light-input surface and a light-output surface which are parallel to each other, and a thickness perpendicular to the light-input surface and the light-output surface. The light-input surface is configured to be located adjacent to the blue light source module, so that the blue light emitted by the blue light source module can get into the plastic substrate through the light-input surface and travel approximately along a direction of the thickness. The at least one light-color conversion material is dispersed in the plastic substrate and capable of converting the blue light entering the plastic substrate into white light which is then emitted from the light-output surface. The plurality of micro-bubbles is dispersed in the plastic substrate and capable of performing at least one of the following functions on the light in the plastic substrate: reflection, refraction or scattering, in order to improve a uniform light-emitting effect of the white light emitted from the light-output surface.

In a preferred embodiment, the blue light source module is a Mini LED array module capable of emitting blue light; the wavelength of the blue light is between 430-500 nm; the at least one light color conversion material comprises at least one of the following: organic dye and inorganic phosphor;

the plurality of micro-bubbles is formed in the plastic substrate by a foaming extrusion process of the light diffusion plate.

In a preferred embodiment, the at least one light color conversion material includes an organic dye with an emission wavelength of 490-650 nm; the organic dye comprises at least one of the following: perylene, Coumarin, Eu(BTFA)3 phen, Benzoxazolium dye, Rhodamine B, Pyrrowmethene dye, Perylene orange, Perylene red.

In a preferred embodiment, the at least one light color conversion material includes two organic dyes with different light-emission wavelengths, one of which has an emission wavelength of 520-530 nm, and the other organic dye has an emission wavelength of 620-630 nm.

In a preferred embodiment, an addition ratio (weight percentage) of the organic dyes is between 0.0001%-5%; a weight-reduction ratio of the plurality of micro-bubbles to the plastic substrate is between 10-35%; an average size of the micro-bubbles is between 60-800 μm.

In a preferred embodiment, the addition ratio (weight percentage) of the organic dyes is between 0.01%-0.5%; the weight-reduction ratio of the plurality of micro-bubbles to the plastic substrate is between 15-25%; the average size of the micro-bubbles is between 60-400 μm; wherein, a formula for calculating the weight-reduction ratio is:

weight-reduction ratio (%)=$(W1-W2)/W2*100\%$ $W1=H*(L1*L2*D)$ wherein:
H is the average thickness of the plastic substrate (mm);
L1 is the length of the plastic substrate (mm);
L2 is the width of the plastic substrate (mm);
D is the density of raw material of the plastic substrate (g/mm$^3$);
W1 is the theoretical weight (g) of the plastic substrate, that is, the weight without the micro-bubbles;
W2 is the actual weight (g) of the plastic substrate, that is, the actual weight of the plastic substrate containing the micro-bubbles that is actually weighed with a scale.

In a preferred embodiment, the size of the micro-bubbles is controlled by a process temperature of the light diffusion plate during the foaming extrusion process; wherein, in the foaming extrusion process of the light diffusion plate, after mixing and foaming a mixture of materials of the light diffusion plate with an extrusion screw section, the temperature of a front stage is lowered at an exit end of a T-die head to achieve the effect of cooling and condensing the micro-bubbles; wherein the temperature of the front stage at the exit end of the T-die head is lowered by 20-30° C.

In a preferred embodiment, during the foaming extrusion process, a nucleating agent is added to assist in controlling the size of the micro-bubbles contained in the light diffusion plate; the nucleating agent contains at least one of the following: calcium carbonate, silicon dioxide, and calcium oxide; a weight percentage of the nucleating agent is 0.01%~5%.

In a preferred embodiment, a thickness of the plastic substrate is in a range of 0.1 mm~3.0 mm; a micro-structure layer is formed on the light-output surface of the plastic substrate; a plurality of micro-structures composed of convex parts or concave parts is formed on an upper surface of the micro-structure layer; the micro-structures are shaped like one of the following: semi-spherical, irregular rough matte, amoeba, and pyramid.

In a preferred embodiment, the thickness of the plastic substrate is in a range of 0.2 mm~2.0 mm; the light-input surface is either a mirror surface that is smooth and does not have micro-structures or has said micro-structure layer; the micro-structure layer of the light-output surface comprises a plurality of pyramid shaped micro-structures.

In order to achieve aforementioned objectives, the present invention provides a manufacturing method of light diffusion plate, comprising:
feeding a base material of a plastic substrate of a light diffusion plate and at least one light color conversion material into a hopper of a foaming extrusion machine;
performing uniform mixing and foaming processes for the fed materials in an extrusion screw section of the foaming extrusion machine at a general processing temperature suitable for polycarbonate;
using a T-die head of the foaming extrusion machine to extrude the uniformly mixed and foamed materials from the extrusion screw section into a plate; and
said extruded plate being rolled by a roller module of the foaming extrusion machine and cooled down, and then the rolled and cooled plate being sent out from a discharge outlet of the foaming extrusion machine as the light diffusion plate;
characterized in that:
after the materials are uniformly mixed and foamed in the extrusion screw section, a temperature of front stage at an exit end of the T-die head is lowered by 20-30° C., such that a size of micro-bubbles contained in the plastic substrate is condensed and shrunk to a range of 60-400 μm.

In a preferred embodiment, in addition to the base material of the plastic substrate and the light-color conversion material, a foaming agent, a nucleating agent, and a diffusing agent are also fed into the hopper of the foaming extrusion machine for performing the uniform mixing and foaming processes; the general processing temperature suitable for polycarbonate is between 220~270° C.; wherein, when a process temperature at a section prior to the T-die head is around 270° C., the temperature of front stage at the exit end of the T-die head is between 240~250° C.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention refers to a light diffusion plate and method for manufacturing the light diffusion plate. The light diffusion plate can be assembled with a blue light source module including a plurality of blue Mini LEDs to form a white light backlight module. The light diffusion plate is added with one or several organic dyes with light-emission wavelength of 490-650 nm, such that the blue light emitted by the Mini LEDs can be converted into white light and emitted from a light-output surface of the light diffusion plate. The light diffusion plate is made by a foaming extrusion process, such that the light diffusion plate can contain a large number of micro-bubbles with a size of 60-400 µm and a weight-reduction ratio of 15-25% that can reflect, refract or scatter the light in the light diffusion plate for improving the uniformity of white light emitted from the light-output surface, so as to improve the MURA problem caused by the light source of backlight module. In addition, during the foaming extrusion process, the size of micro-bubbles is controlled for splitting the light, such that the wavelength of the white light emitted from the light-output surface can be narrower to achieve the effect of wider color gamut display. A nucleating agent is added into the plastic material during the foaming extrusion process of the light diffusion plate, and then, the mixture of nucleating agent, organic dyes and plastic material is uniformly mixed and foamed with an extrusion screw section, in addition, the temperature of the front stage is lowered by around 20-30° C. at the exit end of a T-die head in order to achieve the effect of cooling and condensing the bubbles, and thereby the size of the micro-bubbles can be ideally controlled.

In order to more clearly describe the light diffusion plate and its manufacturing method proposed by the present invention, the following embodiments will be described in detail with the drawings.

Figure 1:
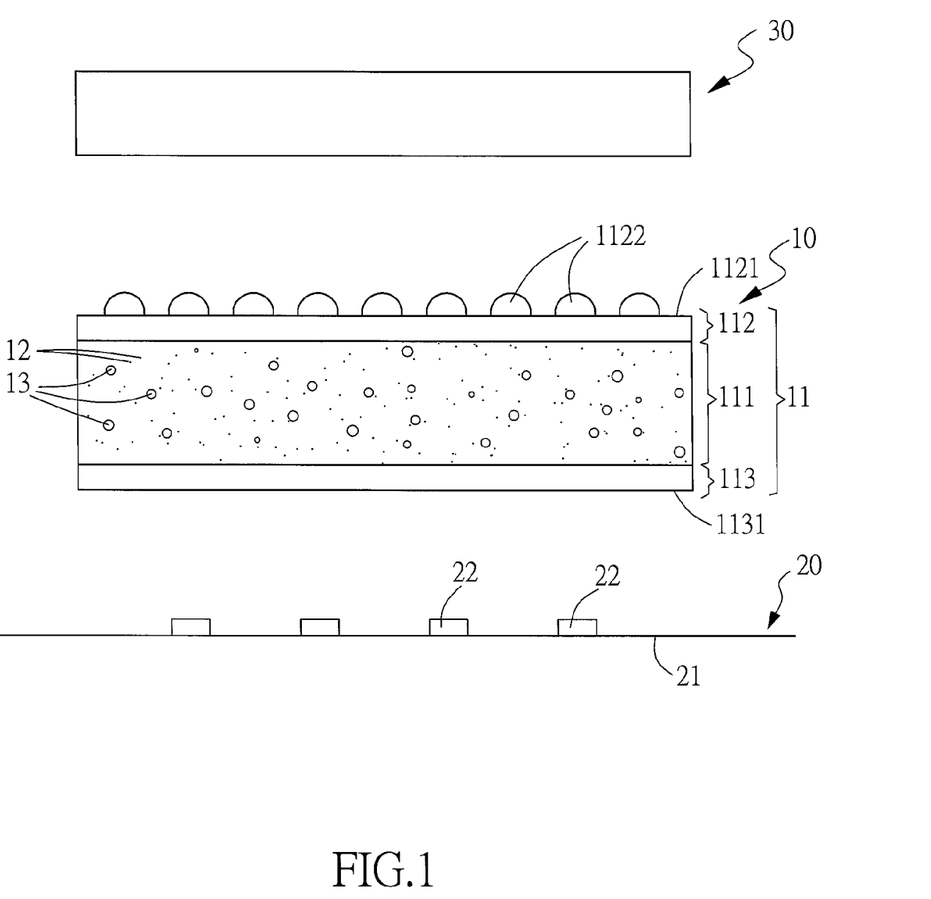
FIG. 1 is a schematic side view of a preferred embodiment of a light diffusion plate of the present invention, which is assembled with a blue light source module in order to form a white light backlight module arranged under a liquid crystal display panel (LCD panel).
Figure 2:
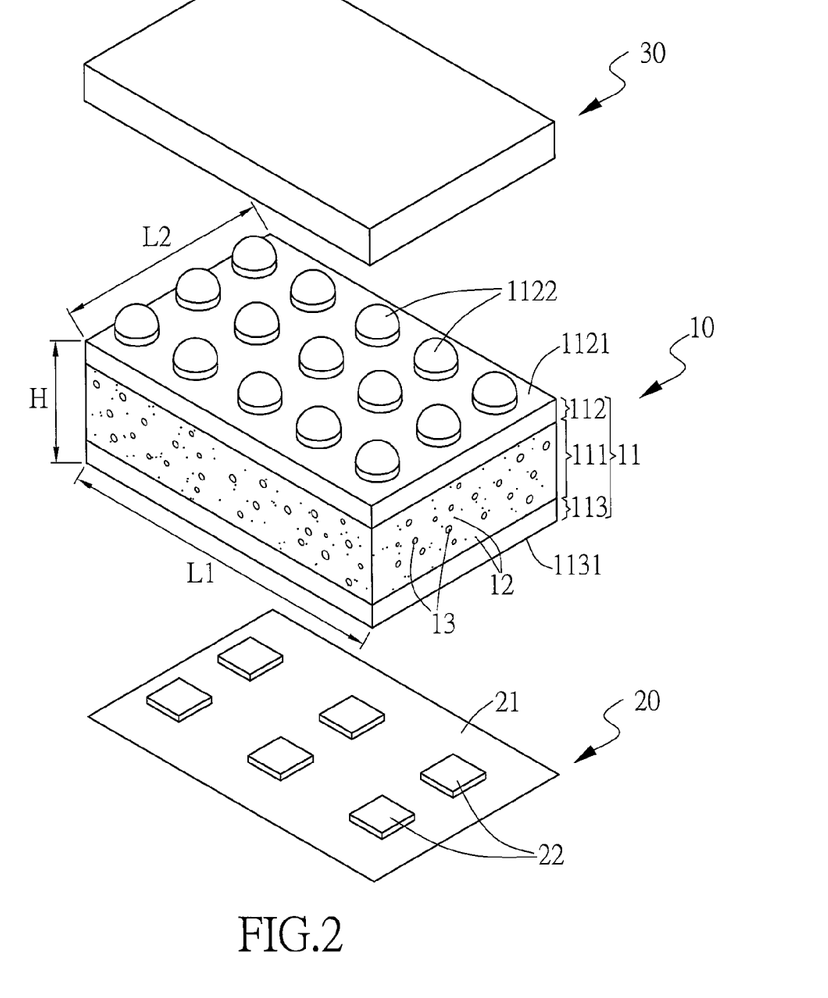
FIG. 2 is a schematic perspective exploded view of a preferred embodiment of a light diffusion plate of the present invention, which is assembled with a blue light source module in order to form a white light backlight module arranged under a liquid crystal display panel (LCD panel).

Please refer to FIG. 1 and FIG. 2, which respectively are a schematic side view and a schematic perspective exploded view of a preferred embodiment of a light diffusion plate 10 of the present invention, which is assembled with a blue light source module 20 in order to form a white light backlight module arranged under a liquid crystal display panel (LCD panel) 30.

As shown in FIG. 1 and FIG. 2, the light diffusion plate 10, the blue light source module 20 under the light diffusion plate 10, and the LCD panel 30 above the light diffusion plate 10 are assembled to form an LCD display module. In a preferred embodiment, the light diffusion plate 10 of the present invention can be assembled with the blue light source module 20 located below to form a white light backlight module for providing white light to the LCD panel 30 located above, so it belongs to the Direct-Lit type backlight module. The light diffusion plate 10 of the present invention is to provide the functions of converting blue light into white light, making the light uniform, and expanding the color gamut of the light. In the preferred embodiment, the light diffusion plate 10 comprises: a plastic substrate 11, at least one light-color conversion material 12, and a plurality of micro-bubbles 13.

In the present invention, the blue light source module 20 is a sub-millimeter light emitting diode (Mini LED) array module capable of emitting blue light, which comprises a circuit board 21 and a plurality of blue Mini LEDs 22 arranged in an array on the top surface of the circuit board 21. In the preferred embodiment, the wavelength of the blue light emitted by each Mini LED 22 is between 430-500 nm, and the grain size (chip size) of each Mini LED 22 is about 100-200 µm.

The plastic substrate 11 has a light-input surface 1131 and a light-output surface 1121 which are relatively large in length and width and parallel to each other, and a relatively small thickness which is perpendicular to the light-input surface 1131 and the light-output surface 1121. The light-input surface 1131 is adjacent to the blue light source module 20, so that the blue light emitted by the blue light source module 20 can get into the plastic substrate 11 through the light-input surface 1131 and travel approximately along the thickness direction. And after the blue light is converted into white light, it is emitted out from the light-output surface 1121 upwardly toward the LCD panel 30. The base material of the plastic substrate 11 of the present invention can be an amorphous or semi-crystalline plastic material, such as polycarbonate (PC), polystyrene, polymethyl methacrylate (PMMA), polyethylene, polypropylene, polyethylene terephthalate (PET) . . . etc. The plastic substrate 11 can be one of the following structures: polymethyl methacrylate (PMMA) single-layer plate, polycarbonate (PC) single-layer plate, PMMA/PC double-layer composite plate, PMMA/PC/PMMA three-layer composite plate, or other kind of polymer material single-layer or multi-layer co-extruded plate . . . etc. The thickness H of the plastic substrate 11 can be implemented in a range of 0.1 mm-3.0 mm, and a preferred thickness range is 0.2 mm-2.0 mm. In this embodiment, the plastic substrate 11 is preferably a multilayer plate (PMMA/PC/PMMA three-layer composite plate), which uses the polycarbonate (PC) as its main-layer 111 material; and, the thickness of this PC main-layer 111 accounts for 60%~99.99% of the total thickness of the plastic substrate 11. The thickness of the sub-layers 112 and 113 located on the upper and lower sides of the main-layer 111 respectively accounts for 0.01%~40% of the total thickness of the plastic substrate 11. The material of the sub-layers 112 and 113 can be selected from any of the following: PMMA, Modified PMMA . . . etc. A micro-structure layer is formed on the light-output surface 1121 of the plastic substrate 11 (that is, the upper surface of the upper PMMA sub-layer 112) by extrusion molding. There is a plurality of micro-structures 1122 composed of convex parts or concave parts on the upper surface of the micro-structure layer, which can be regularly or irregularly distributed on the top surface of the light diffusion plate 10 (i.e., the light-output surface 1121 of the plastic substrate 11). The micro-structures 1122 can be shaped like one of the following: semi-spherical, irregular rough matte, amoeba, pyramid . . . etc. The light-input surface 1131 (that is, the lower surface of the lower PMMA sub-layer 113) can be one of the following: a mirror surface that is smooth and does not have micro-structures, or has another micro-structure layer. In this preferred embodiment of the present invention, the light-input surface 1131 (that is, the lower surface of the lower PMMA sub-layer 113) is a mirror surface; in addition, the micro-structure layer of the light-output surface 1121 comprises a plurality of pyramid shaped micro-structures 1122, and this design has the best effect of improving the overall brightness.

The at least one light color conversion material 12 is mixed and uniformly dispersed in the material of the main-layer 111 of the plastic substrate 11, and can convert the blue light entering the plastic substrate 11 into white light and then emit it from the light-output surface 1121. The at least one light color conversion material may include one of the following: organic dye, inorganic phosphor, or both. In the present invention, the molecule of the organic dye contains one or more of the following functional groups: azo, nitro, nitroso, carbonyl . . . etc.; in addition, the organic dye may include at least one of the following: perylene, Coumarin, Eu(BTFA)3 phen, Benzoxazolium dye, Rhodamine B, Pyrrowmethene dye, Perylene orange, Perylene red, . . . etc. In a preferred embodiment, the at least one light color conversion material 12 includes an organic dye with an emission wavelength of 490-650 nm. In another preferred embodiment of the present invention, the at least one light color conversion material 12 includes two or more organic dyes with different light-emission wavelengths, one of which has an emission wavelength of 520-530 nm, and the other organic dye has an emission wavelength of 620-630 nm. The applicable addition ratio (weight percentage) of the organic dyes is 0.0001%-5%, and the preferred embodiment is 0.01%-0.5%. The addition amount/ratio of the organic dyes is adjusted according to the type of organic dyes and the target thickness of the light diffusion plate 10. In another embodiment, the at least one light color conversion material 12 of the present invention can also be added with one or more inorganic phosphors, or a combination of organic dyes and inorganic phosphors, and uniformly dispersed within the plastic substrate 11. However, organic dyes are generally more uniformly mixed into the plastic substrate material of the light diffusion plate 10 than inorganic phosphors; in addition, the physical properties of the light diffusion plate 10 with two organic dyes and no inorganic phosphors added will be relatively better than the physical properties of the light diffusion plate 10 with at least one inorganic phosphor added.

The plurality of micro-bubbles 13 are dispersed in the material of the main-layer 111 of the plastic substrate 11; these micro-bubbles 13 can perform at least one of the following functions on the light in the plastic substrate 11: reflection, refraction or scattering. A proper proportion of micro-bubbles 13 can improve the uniform light-emitting effect of the white light emitted from the light-output surface 1121, and thereby improve the MURA problem caused by the light source of the backlight module. In addition, by controlling the size of the micro-bubbles 13 for light splitting, the wavelength of the white light emitted from the light-output surface 1121 can be narrower, and thereby achieves a wider color gamut display effect. In the present invention, the applicable ratio of the plurality of micro-bubbles 13 to the plastic substrate 11 (also referred to as weight reduction percentage or weight-reduction ratio (%)) may be between 10-35%; in addition, the applicable average size of the micro-bubbles 13 is between 60-800 μm. In a preferred embodiment, the weight-reduction ratio of the plurality of micro-bubbles 13 to the plastic substrate 11 is between 15-25%, and the average size of the micro-bubbles 13 is preferably between 60-400 μm. Wherein, the formula for calculating the weight-reduction ratio is:

amount ratio of the micro-bubbles (%)=weight-reduction ratio (%)=$(W1-W2)/W2*100\%$;

$W1=H*(L1*L2*D)$;

wherein (refer to FIG. 2):
H is the average thickness of the plastic substrate (mm);
L1 is the length of the plastic substrate (mm);
L2 is the width of the plastic substrate (mm);
D is the density of raw material of the plastic substrate (g/mm$^3$);
W1 is the theoretical weight (g) of the plastic substrate, that is, the weight without the micro-bubbles;

W2 is the actual weight (g) of the plastic substrate, that is, the actual weight of the plastic substrate containing the micro-bubbles that is actually weighed with a scale.

In the present invention, the plurality of micro-bubbles 13 are formed in the plastic substrate 11 by a foaming extrusion process of the light diffusion plate 10. Wherein, the proportion (weight-reduction ratio) of the micro-bubbles 13 can be controlled by the amount of foaming agent added; in addition, the size of the micro-bubbles 13 can be controlled by the process temperature of the light diffusion plate 10 in the foaming extrusion process and the type and amount of nucleating agents added. In the present invention, the foaming agent used is a commercially available conventional high-temperature foaming agent, such as (but not limited to): 5-Phenyltetrazole (5-PT), or Azodicarbonamide (also known as Foamer ADC) . . . etc. The amount of foaming agent of different types and brands will be proportional to the amount of micro-bubbles generated within the appropriate foaming temperature range; therefore, the weight-reduction ratio of the micro-bubbles 13 to the plastic substrate 11 can be adjusted to the required range by increasing or decreasing the amount of foaming agent added. The nucleating agent is a commercially available conventional nucleating agent, and the ingredients can be: calcium carbonate, silicon dioxide, calcium oxide . . . etc.; the function of the nucleating agent is to increase the number of micro-bubble nucleuses and reduce the average size of nucleuses, which can be used to control the size of micro-bubbles. Wherein, an applicable embodiment of the added weight percentage of the nucleating agent is 0.01%~5%, and the best ratio is 0.1~0.5%.

Figure 3:
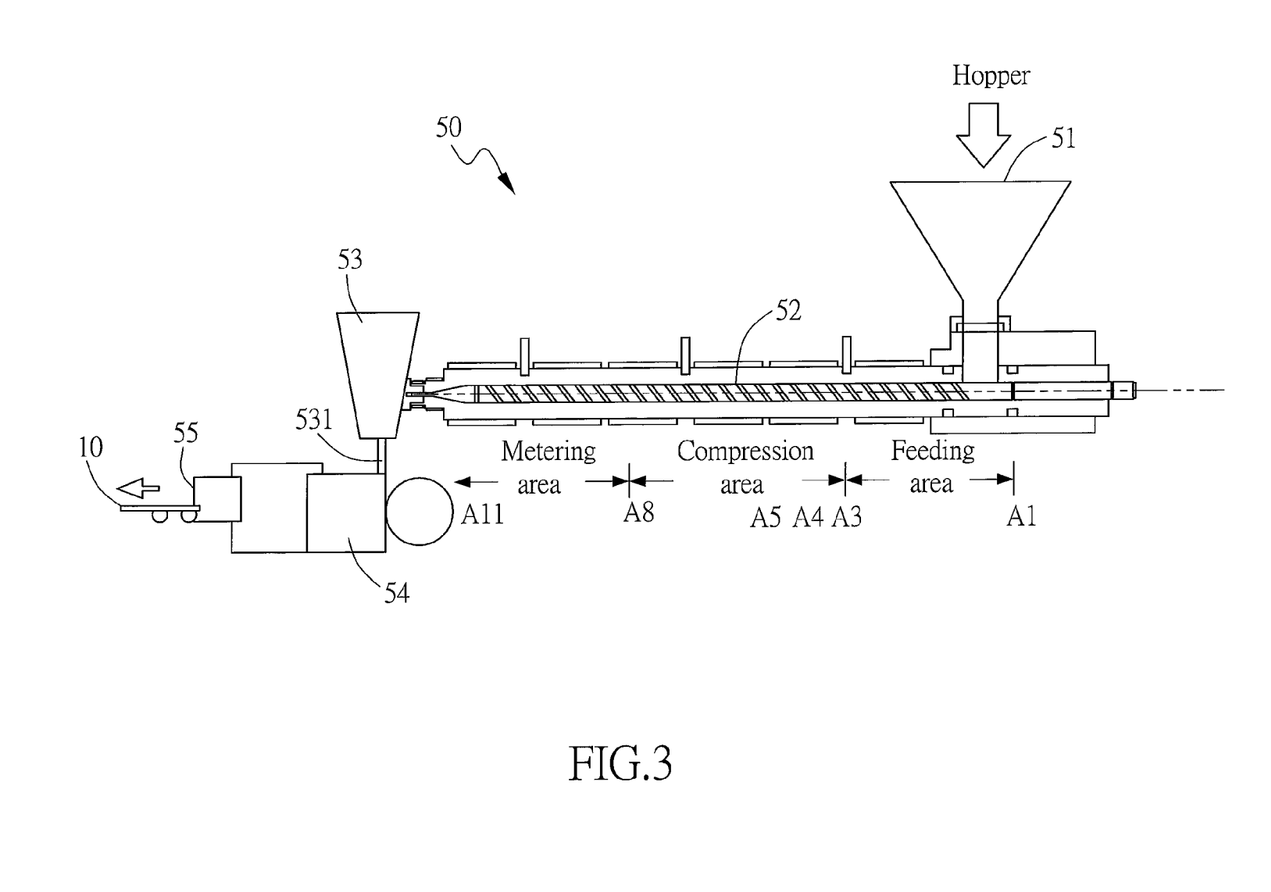
FIG. 3 is a schematic diagram of an embodiment of the manufacturing method of the light diffusion plate 10 of the present invention.

Please refer to FIG. 3, which is a schematic diagram of an embodiment of the manufacturing method of the light diffusion plate 10 of the present invention. In the foaming extrusion process of the light diffusion plate 10, the base material of the plastic substrate 11 constituting the light diffusion plate 10 together with at least one light color conversion material, a foaming agent, a nucleating agent, and a diffusing agent are first fed into the hopper 51 of the foaming extrusion machine 50. Then, the mixture of these fed materials sequentially passes through sections A1 to A11 (including the feeding area of the A1 to A3 sections, the compression and kneading area of the A4 to A8 sections, and the metering area of the A9 to A11 sections) of the extrusion screw section 52 to perform uniform mixing and foaming processes at a general processing temperature suitable for polycarbonate (the process temperature is adjusted depending on the type of foaming agent, usually between 220 and 270° C.). Then, a T-die head 53 is used to extrude the uniformly kneaded and foamed base material from the A11 section of the extrusion screw section 52 into a continuous plate with predetermined thickness and width. After that, the plate is rolled by the roller module 54 and cooled down, and then the cooled light diffusion plate 10 is sent out from the discharge outlet 55. In the present invention, when the base material constituting the plastic substrate together with the light color conversion material, the foaming agent and the nucleating agent are uniformly kneaded and foamed in the extrusion screw section 52 through sections A1 to A11, the manufacturing method of the light diffusion plate of the present invention intentionally reduces the temperature of the front stage at the exit end 531 (also called the die lip) of the T-die head 53, so as to cool and shrink the air-bubbles of the micro-bubbles contained in the plastic substrate. Wherein, the temperature of the front stage at the exit end 531 of the T-die head 53 is intentionally reduced to be 20-30° C. lower than the process temperature of its previous section of the extrusion screw section 52 (that is, the A11 section). For example, if the processing temperature at the A11 section is about 270° C., then the temperature of the front stage at the exit end 531 of the T-die head 53 will be reduced to 240-250° C., such that the size of the micro-bubbles contained therein can be condensed and shrunk to the range of 60-400 μm. By using the above novel technique to control the size of the micro-bubbles, the present invention makes the size of the micro-bubbles to be smaller than 400 μm (<400 μm), the center wavelength moves backward by 4~5 nm, and has the effect of narrowing the wavelength, which can make the color gamut wider. When the average air-bubble size of microbubbles is between 400~600 μm, although the wavelength is not narrowed, the center wavelength still moves back 2~3 nm; however, if the average air-bubble size of microbubbles is larger than 600 μm (>600 μm), then there will be no obvious effect. In an embodiment, the diffusing agent includes diffusing particles composed of at least one of the following materials: calcium carbonate, silicon dioxide, titanium dioxide, silicone resin particles, polymethyl methacrylate particles; wherein, the weight percentage of the added diffusing agent is 0.1%-10%.

The applicant prepares a plurality of light diffusion plate samples by adding a single organic dye of different light-emission wavelengths respectively to a number of different light diffusion plate samples (Comparisons 1 to 5 and Example 1 as shown in Table 1 below). The light-emission wavelengths of the organic dye added to different samples are selected in the range of 490~650 nm and are different from each other, as the samples shown in Comparisons 1 to 5 and Example 1 in Table 1 below. And then, the applicant observes the output light color of each light diffusion plate sample with blue Mini LEDs, and measures the transmittance (TT) and illuminance value (lux) of each sample, and obtains the test results as shown in Table 1.

TABLE 1

Light performance of several light diffusion plate samples added with single organic dye of different wavelengths

| No. of Sample | Ingredients added (%) Polycarbonate + diffusion particles | organic dye | | | thickness of light diffusion plate (mm) | TT | lux | Output light color using blue Mini LED |
|---|---|---|---|---|---|---|---|---|
| | | No. | Wavelength (nm) | FWHM (nm) | | | | |
| Comparison 1 | 100 | NA | — | — | 1.496 | 38.53 | 3550 | blue |
| Comparison 2 | 100 | 1 | 490 | 38 | 1.498 | 39.74 | 22100 | white greenish |
| Comparison 3 | 100 | 2 | 525 | 31 | 1.491 | 39.85 | 21900 | white slightly yellow |
| Example 1 | 100 | 3 | 539 | 31 | 1.491 | 38.41 | 21630 | white slightly yellow |
| Comparison 4 | 100 | 4 | 580 | 50 | 1.489 | 37.95 | 12530 | white orangish |
| Comparison 5 | 100 | 5 | 613 | 41 | 1.493 | 37.56 | 9800 | red |

It can be seen from Table 1 above that, the two samples of Comparison 3 and Example 1 have relatively better TT, lux and output light color (that is, the output light color is closer to white light) because the light-emission wavelength of the added single organic dye is between 520~540 nm. However, due to the lack of red light wavelengths, the color saturation of these two samples of Comparison 3 and Example 1 is still not high enough, only barely usable. As for other samples (Comparisons 1, 2, 4, 5), the light-emission wavelength of the single organic dye added is either lower than 500 nm or higher than 560 nm, so the color of the output light is far from white light, which is no value of use.

In addition, the applicant also prepares a plurality of light diffusion plate samples by adding two different organic dyes of different light-emission wavelengths respectively to a number of different light diffusion plate samples (Comparisons 6 to 9 and Example 2 as shown in Table 2 below). The light-emission wavelengths of the organic dyes added to different samples are separately selected in the range of 490~650 nm and are different from each other. As the samples shown in Comparisons 6 to 9 and Example 2 in Table 2 below, the light-emission wavelength of the first organic dye added is in the range of 490~530 nm, and the light-emission wavelength of the second organic dye is in the range of 600~4650 nm. And then, the applicant observes the output light color of each light diffusion plate sample with blue Mini LEDs, and measures the transmittance (TT) and illuminance value (lux) of each sample, and obtains the test results as shown in Table 2.

TABLE 2

Light performance of several light diffusion plate samples added with two different organic dyes of different wavelengths

| No. of Sample | Ingredients added (%) Polycarbonate + diffusion particles | organic dye 1 | | | organic dye 2 | | | thickness of light diffusion plate (mm) | TT | lux | Output light color using blue Mini LED |
|---|---|---|---|---|---|---|---|---|---|---|---|
| | | No. | Wavelength (nm) | FWHM (nm) | No. | Wavelength (nm) | FWHM (nm) | | | | |
| Comparison 6 | 100 | 1 | 490 | 38 | 5 | 613 | 41 | 1.499 | 39.12 | 21880 | white yellowish |
| Comparison 7 | 100 | 1 | 490 | 38 | 6 | 626 | 41 | 1.482 | 39.05 | 21840 | white yellowish |

TABLE 2-continued

Light performance of several light diffusion plate
samples added with two different organic dyes of different wavelengths

| No. of Sample | Ingredients added (%) Polycarbonate + diffusion particles | organic dye 1 | | | organic dye 2 | | | thickness of light diffusion plate (mm) | TT | lux | Output light color using blue Mini LED |
|---|---|---|---|---|---|---|---|---|---|---|---|
| | | No. | Wavelength (nm) | FWHM (nm) | No. | Wavelength (nm) | FWHM (nm) | | | | |
| Comparison 8 | 100 | 2 | 525 | 31 | 5 | 613 | 41 | 1.487 | 39.25 | 21630 | white slightly yellow |
| Example 2 | 100 | 2 | 525 | 31 | 6 | 626 | 41 | 1.488 | 39.17 | 21790 | white |
| Comparison 9 | 100 | 2 | 525 | 31 | 7 | 650 | 41 | 1.491 | 38.54 | 17510 | white reddish |

It can be seen from Table 2 above that, the sample of Example 2 has relatively the best TT, lux and output light color (that is, the output light color is white light) because the light-emission wavelengths of the added two organic dyes are respectively between 520~530 nm (wavelength of green light) and 620~630 nm (wavelength of red light); not only the color purity is high, but also the color gamut is wide. In contrast, for other samples (Comparisons 6, 7, 8, 9), because the light-emission wavelength of at least one of the two organic dyes added is not between 520~530 nm or 620~630 nm, the color of output light of these samples (Comparisons 6, 7, 8, 9) is still unlike the white light, and thus the light performance thereof is not as good as the sample of Example 2.

Moreover, the applicant prepares two different light diffusion plate samples by adding one or two different inorganic phosphors of different light-emission wavelengths respectively to these two light diffusion plate samples (Comparison 10 and Example 3 as shown in Table 3 below). Wherein, the sample of Comparison 10 only added a single organic dye with the light-emission wavelength range of 520~530 nm, while the sample of Example 3 added two organic dyes with the light-emission wavelengths range of 520~530 nm and 620~630 nm, respectively. And then, the applicant observes the output light color of each light diffusion plate sample with blue Mini LEDs, and measures the transmittance (TT) and illuminance value (lux) of each sample, and obtains the test results as shown in Table 3.

It can be seen from Table 3 above that, the sample of Example 3 has relatively the best TUT, lux and output light color (that is, the output light color is white light) because the light-emission wavelengths of the added two inorganic phosphors are respectively between 520~530 nm (wavelength of green light) and 620~630 nm (wavelength of red light). In contrast, for the sample Comparison 10, because the light-emission wavelength of the only one inorganic phosphor added is between 520~530 nm, the color of output light of this sample Comparison 10 is still unlike the white light, and thus the light performance thereof is not as good as the sample of Example 3.

The applicant prepares yet another light diffusion plate sample by adding one inorganic phosphor and one organic dye of different light-emission wavelengths (Example 4 as shown in Table 4 below). Wherein, for this sample of Example 4, the range of light-emission wavelength of the added inorganic phosphor is between 520~530 nm, while the range of light-emission wavelength of the added organic dye is between 620~630 nm. And then, the applicant observes the output light color of this light diffusion plate sample with blue Mini LEDs, and measures the transmittance (TT) and illuminance value (lux) of this sample, and obtains the test results as shown in Table 4.

TABLE 3

Light performance of several light diffusion plate samples added with
one or two different inorganic phosphors of different wavelengths

| No. of Sample | Ingredients added (%) Polycarbonate + diffusion particles | inorganic phosphor 1 | | | inorganic phosphor 2 | | | thickness of light diffusion plate (mm) | TT | lux | Output light color using blue Mini LED |
|---|---|---|---|---|---|---|---|---|---|---|---|
| | | No. | Wavelength (nm) | FWHM (nm) | No. | Wavelength (nm) | FWHM (nm) | | | | |
| Comparison 10 | 100 | 8 | 528 | 29 | — | — | — | 1.498 | 38.93 | 21840 | white slightly yellow |
| Example 3 | 100 | 8 | 528 | 29 | 9 | 630 | 42 | 1.501 | 39.04 | 21890 | white |

TABLE 3

Light performance of the light diffusion plate sample added with one inorganic phosphor and one organic dye of different wavelengths

| No. of Sample | Ingredients added (%) Polycarbonate + diffusion particles | inorganic phosphor 1 No. | inorganic phosphor 1 Wavelength (nm) | inorganic phosphor 1 FWHM (nm) | inorganic phosphor 2 No. | inorganic phosphor 2 Wavelength (nm) | inorganic phosphor 2 FWHM (nm) | thickness of light diffusion plate (mm) | TT | lux | Output light color using blue Mini LED |
|---|---|---|---|---|---|---|---|---|---|---|---|
| Example 4 | 100 | 8 | 528 | 29 | 6 | 626 | 41 | 1.496 | 38.25 | 22160 | white |

It can be seen from Table 4 above that, the sample of Example 4 has relatively the best TT, lux and output light color (that is, the output light color is white light) because the light-emission wavelengths of the added one inorganic phosphor and one organic dye are respectively between 520~530 nm (wavelength of green light) and 620~630 nm (wavelength of red light).

Figure 4:
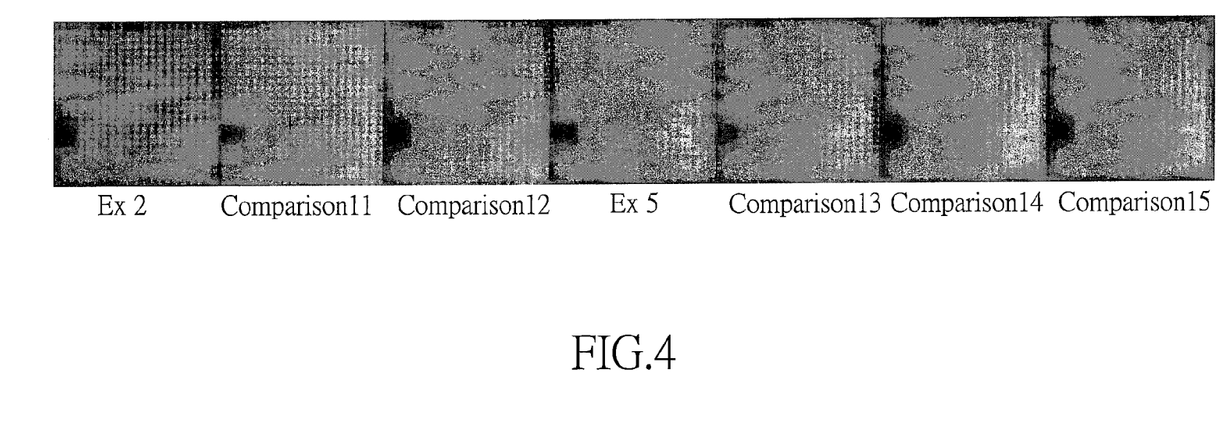
FIG. 4 is a MURA diagram obtained by testing the light diffusion plate samples shown in Table 5 according to the present invention.

Furthermore, the applicant prepares several light diffusion plate samples by adding different proportions of foaming agent to several different light diffusion plate samples (Comparisons 11-15 and Examples 2, 5 as shown in Table 5 below) in order to make the proportions of micro-bubbles contained in the plastic substrate (i.e., the weight-reduction ratio) different in these samples. And then, the applicant observes the improvement degree and brightness difference of the MURA of these different light diffusion plate samples with different proportions of micro-bubbles (weight-reduction ratio). The test results are shown in Table 5 and FIG. 4. The thickness of each light diffusion plate sample in Table 5 is between 1.479~1.495 mm, and two organic dyes with different wavelengths are also added in each sample; wherein, one is the organic dye No. 2 (wavelength is 525 nm, FWHM value is 31 nm), and the other is organic dye No. 6 whose wavelength is 626 nm and FWHM value is 41 nm. FIG. 4 is a MURA diagram obtained by testing the light diffusion plate samples shown in Table 5 according to the present invention. In the MURA diagram of each light diffusion plate sample shown in FIG. 4, the bright spots above the LEDs are called as "bright spots", the dark spots between these LEDs are called as "dark spots", and the obvious contrast between these bright and dark spots is MURA.

TABLE 5

The light performance of several light diffusion plate samples with different proportions of foaming agent

| No. of Sample | Ingredients added (%) Polycarbonate + diffusion particles | foaming agent | TT | lux | Weight-reduction ratio (%) | bubble diameter (μm) | Output light color using blue Mini LED |
|---|---|---|---|---|---|---|---|
| Example 2 | 100 | NA | 39.17 | 21790 | — | — | white |
| Comparison 11 | 100 | 1.5 | 45.84 | 23860 | 8 | 65~493 | white |
| Comparison 12 | 100 | 2.5 | 40.66 | 22580 | 15 | 65~452 | white |
| Example 5 | 100 | 3 | 37.50 | 21570 | 20 | 60~431 | white |
| Comparison 13 | 100 | 4 | 34.21 | 20130 | 25 | 71~446 | white |
| Comparison 14 | 100 | 4.5 | 29.95 | 17120 | 31 | 68~419 | white |
| Comparison 15 | 100 | 5 | 26.52 | 15700 | 36 | 63~405 | white |

It can be seen from the contents of Table 5 above and the MURA diagram of each light diffusion plate sample shown in FIG. 4 that, when the amount of foaming agent added is larger, although the masking effect of MURA will be improved, but it will cause too much loss of brightness. Wherein, from Table 5 and FIG. 4, it can be seen that, when the weight-reduction ratio of the foaming agent added to the light diffusion plate sample is in the range of 15-25%, a relatively better balance of MURA and brightness can be obtained.

In addition, the applicant used different process temperatures in the foaming extrusion process of several different light diffusion plate samples (Comparisons 16-18 and Examples 2, 5, 6 as shown in Table 6 below) in order to control the diameter of the micro-bubbles contained in each light diffusion plate sample (referred to as bubble diameter). In other words, during the foaming extrusion process of each light diffusion plate sample, after the mixture of materials of the plastic substrate is uniformly mixed and foamed in the extrusion screw section, various different temperature differences are used at the exit end of the T-die head to reduce the temperature of the front stage, so as to cool and condense the micro-bubbles. And then, the bubble diameter size range of the micro-bubbles formed in each light diffusion plate sample is measured, and the test results are shown in Table 6. The thickness of each light diffusion plate sample in Table 6 is between 1.488~1.505 mm, and two organic dyes with different wavelengths are also added in each sample; wherein, one is the organic dye No. 2 (wavelength is 525 nm, FWHM value is 31 nm), and the other is organic dye No. 6 whose wavelength is 626 nm and FWHM value is 41 nm. The extrusion temperature values listed in the columns A1, A2, A3, A4, A5~A11 and T-die of Table 6 are respectively corresponding to the process temperature values at the sections A1 to A11 and the exit end 531 of T-die head 53 of the foaming extrusion machine 50 shown in FIG. 3.

TABLE 6

Test results of using different process temperatures in the foaming extrusion process to control the size of the micro-bubbles contained in each light diffusion plate sample

| No. of Sample | Amount of foaming agent added (%) | extrusion temperature (° C.) | | | | | | Weight-reduction ratio (%) | bubble diameter (μm) |
|---|---|---|---|---|---|---|---|---|---|
| | | A1 hopper | A2 | A3 | A4 | A5~A11 | T-die exit end | | |
| Example 2 | NA | 230 | 240 | 250 | 260 | 270 | 270 | — | — |
| Example 5 | 3 | 220 | 230 | 240 | 250 | 270 | 250 | 20 | 60~431 |
| Example 6 | 3 | 220 | 230 | 240 | 250 | 270 | 240 | 21 | 60~331 |
| Comparison 16 | 3 | 220 | 230 | 240 | 250 | 270 | 270 | 19 | 95~586 |
| Comparison 17 | 3 | 230 | 240 | 250 | 260 | 270 | 270 | 21 | 155~810 |
| Comparison 18 | 3 + nucleating agent | 230 | 240 | 250 | 260 | 270 | 270 | 20 | 120~685 |

It can be seen from the content of the above Table 6 and the positions of the A1 to A11 sections and the T-die head 53 in the foaming extrusion machine 50 shown in FIG. 3 that, during the foam extrusion process of the light diffusion plate samples (Comparisons 16-18 and Examples 2, 5, 6), the front-end temperature at the exit end of T-die head was reduced (for example, the temperature at the exit end of Example 5 is 250° C., Example 6 is 240° C.) to make it 20~30° C. lower than the temperature at the prior section A11 (for example, the temperatures at section A11 of Example 5 and Example 6 are both 270° C.); such that, the bubble diameter of the micro-bubbles contained in the light diffusion plate sample can be shrunk to the range of 60~400 μm. If the front end temperature at the exit end of T-die head is too high, it will cause premature gassing and cause the bubble diameter to be too large; for example, the T-die exit end temperature of Comparison 17 is 270° C. and the bubble diameter is as large as 155~810 μm. On the other hand, the bubble diameter can also be effectively reduced by additionally adding a nucleating agent. As shown in Comparison 18, with the addition of a nucleating agent, even if other processing conditions (including the T-die exit end temperature is 270° C.) are same as those of Comparison 17, the bubble diameter of Comparison 18 is still reduced to 120~685 μm.

Continuing the contents of Table 6 discussed above, when different processing temperatures are used in the foaming extrusion process to control the size of bubble diameter of the micro-bubbles contained in each light diffusion plate sample, the wavelength shift and FWHM value of each light diffusion plate sample before and after the plate-extrusion process will be also different, as shown in Table 7 below.

TABLE 7

Comparison table of the differences between the wavelength shifts of the organic dyes and the FWHM values before and after the plate-extrusion process of each light diffusion plate sample when using different processing temperatures in the foaming extrusion process to control the bubble diameter of the micro-bubbles contained in each light diffusion plate sample

| | | organic dye No. 2 | | | | organic dye No. 6 | | | |
|---|---|---|---|---|---|---|---|---|---|
| | | before plate-extrusion | | after plate-extrusion | | before plate-extrusion | | after plate-extrusion | |
| No. of Sample | bubble diameter (μm) | Wavelength | FWHM | Wavelength | FWHM | Wavelength | FWHM | Wavelength | FWHM |
| Example 2 | — | 525 | 31 | 525 | 31 | 626 | 41 | 626 | 41 |
| Example 5 | 60~431 | 525 | 31 | 528 | 31 | 626 | 41 | 628 | 41 |
| Example 6 | 60~331 | 525 | 31 | 530 | 27 | 626 | 41 | 630 | 36 |
| Comparison 16 | 95~586 | 525 | 31 | 528 | 31 | 626 | 41 | 628 | 41 |
| Comparison 17 | 155~810 | 525 | 31 | 525 | 31 | 626 | 41 | 626 | 41 |
| Comparison 18 | 120~685 | 525 | 31 | 525 | 31 | 626 | 41 | 626 | 41 |

Figure 5:
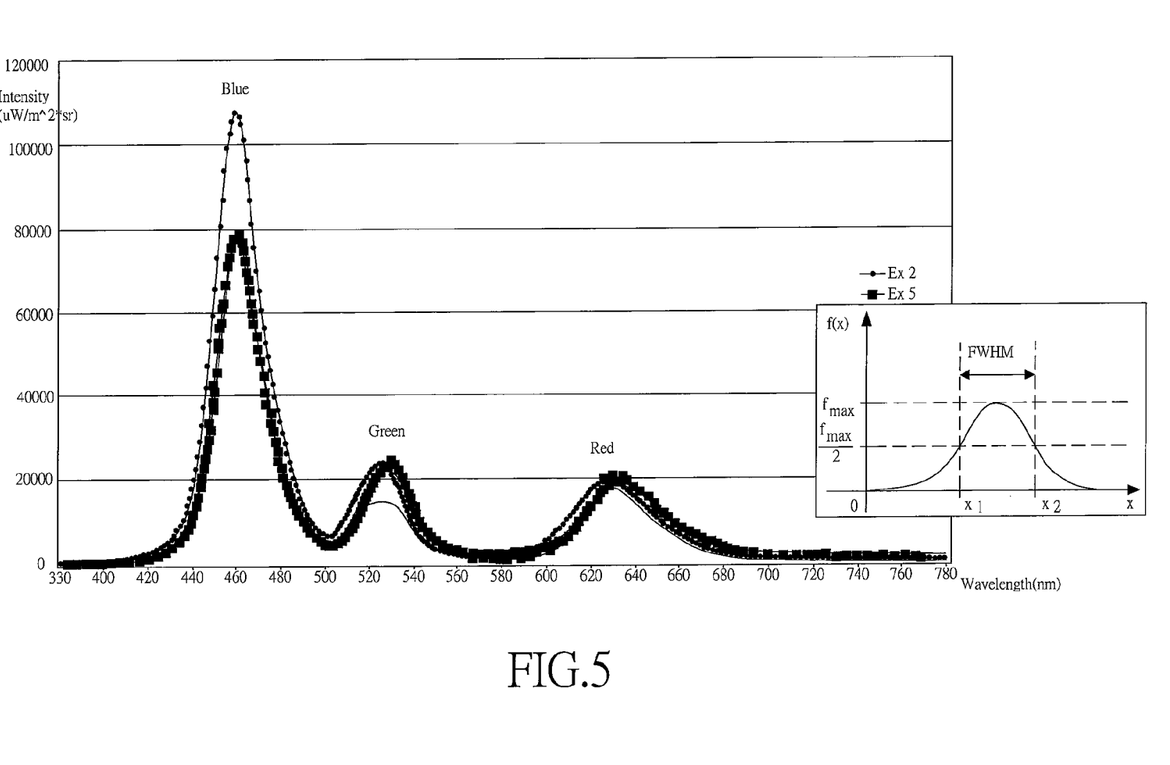
FIG. 5, which is a spectrum diagram of light intensity vs. light wavelength obtained according to the light diffusion plate samples shown in Table 6 and Table 7 (Example 2 and Example 5) of the present invention.

Please refer to FIG. 5, which is a spectrum diagram of light intensity vs. light wavelength obtained according to the light diffusion plate samples shown in Table 6 and Table 7 (Example 2 and Example 5) of the present invention. The so-called color gamut refers to the number of colors that a color monitor can display, and it is also called color saturation in practice. Relative to the importance of the color rendering of the lighting source, the color gamut characteristic is an important indicator of the display's color ability. The color gamut characteristics of color monitors are usually closely related to the dominant wavelengths of the red, green, and blue primary colors and their color purity. Under appropriate dominant wavelengths, high color purity of the three primary colors can obtain a wider color gamut. Therefore, at the appropriate wavelength, the smaller the FWHM value usually means the higher the color purity, the wider the color gamut, and the higher the color saturation. From the above Table 7 and FIG. 5, it can be seen that, when the bubble diameter of the micro-bubbles contained in the light diffusion plate is controlled by reducing the temperature of the front end of the T-die head during the foaming extrusion process, the light provided by the LED light source module can be reflected, scattered or refracted by the micro-bubbles; and moreover, different bubble diameter can get different effects. When the bubble diameter is smaller than 400 μm, as in the light diffusion plate sample of Example 6, the center wavelengths of both before and after the plate-extrusion process are moved backward by about 4~5 nm, and the effect of narrowing the wavelength can make the color gamut wider. Specifically, the organic dye number 2 of Example 6 has a wavelength of 525 nm before plate-extrusion and 530 nm after plate-extrusion, that is, it is moved backward by 5 nm; in the meantime, its full width at half maximum (FWHM) value has also been narrowed from 31 nm before plate-extrusion to 27 nm after plate-extrusion, which is equivalent to a narrowing of 4 nm. Similarly, the organic dye number 6 of Example 6 has a wavelength of 626 nm before plate-extrusion and 630 nm after plate-extrusion, which is 4 nm backward; in the meantime, its FWHM value is also narrowed from 41 nm before plate-extrusion to 36 nm after plate-extrusion, which is equivalent to narrowing by 5 nm. When the average bubble diameter of the micro-bubbles contained in the light diffusion plate sample is 400~600 μm, such as the light diffusion plate samples of Example 5 and Comparison 16, although the FWHM values of the organic dyes No. 2 and No. 6 are not narrowed, however their center wavelengths still moves backward for about 2~3 nm. Furthermore, when the average bubble diameter of the micro-bubbles contained in the light diffusion plate sample is greater than 600 μm, as in the light diffusion plate samples of Example 2 and Comparisons 17, 18, there is no effect of shifting the center wavelengths and narrowing the FWHM values.

The applicant provides a plurality of microstructures on the light-output surface of several different light diffusion plate samples (Example 7 and Comparison 19 shown in Table 8 below). When the light source emits light through the light diffusion plate, the light is diffused again by these microstructures to increase the average brightness of the light diffusion plate. The measured values of the brightness are shown in Table 8. Wherein, the thickness of the two light diffusion plate samples in Table 8 is 1.491 mm and 1.485 mm respectively; both of these samples are added with 3% foaming agent; and two organic dyes with different wavelengths are also added in each sample; wherein, one is the organic dye No. 2 (wavelength is 525 nm, FWHM value is 31 nm), and the other is organic dye No. 6 whose wavelength is 626 nm and FWHM value is 41 nm.

TABLE 8

In the foaming extrusion process, different rollers are used to form a smooth surface or microstructures on the light-output surface of each light diffusion plate sample and the result of the luminance measurement

| No. of Sample | Ingredients added (%) | | microstructure formed by Rollers light-input/light-output | Thickness (mm) | TT | Center lux | Average lux |
| --- | --- | --- | --- | --- | --- | --- | --- |
| | Polycarbonate + diffusion particles + foaming agent | Amount of foaming agent added | | | | | |
| Example 7 | 100 | 3 | smooth/pyramid | 1.491 | 37.64 | 21570 | 20020 |
| Comparison 19 | 100 | 3 | smooth/smooth | 1.485 | 37.89 | 21640 | 19370 |

It can be seen from Table 8 that, the light diffusion plate sample of Example 7 is provided with a plurality of pyramid-shaped microstructures on the light-output surface, while Comparison 19 is not. Under the premise that the other process and material conditions are the same as those of Comparison 19, the average brightness value of Example 7 is 20020, which is higher than the average brightness value 19370 of Comparison 19.

While the present invention has been shown and described with reference to the preferred embodiments thereof and the illustrative drawings, it should not be considered as limited thereby. Various possible modifications and alterations can be conceived by persons skilled without departing from the scope and the spirit of the present invention.

What is claimed is:

1. A manufacturing method for manufacturing a light diffusion plate, comprising:
   feeding a base material of a plastic substrate of the light diffusion plate and at least one light color conversion material into a hopper of a foaming extrusion machine;
   performing uniform mixing and foaming processes for the fed materials in an extrusion screw section of the foaming extrusion machine at a general processing temperature suitable for polycarbonate; wherein said general processing temperature suitable for polycarbonate is between 220~270° C.;

using a T-die head of the foaming extrusion machine to extrude the uniformly mixed and foamed materials from the extrusion screw section into a plate; and said extruded plate being rolled by a roller module of the foaming extrusion machine and cooled down, and then the rolled and cooled plate being sent out from a discharge outlet of the foaming extrusion machine as the light diffusion plate;

characterized in that:

after the materials are uniformly mixed and foamed in the extrusion screw section, a temperature of front stage at an exit end of the T-die head is lowered by 20-30° C. lower than a process temperature of a section of the extrusion screw section just previous to the T-die head, such that a size of micro-bubbles contained in the plastic substrate is condensed and shrunk to a range of 60-400 μm.

2. The manufacturing method of claim 1, wherein:

in addition to the base material of the plastic substrate and the light-color conversion material, a foaming agent, a nucleating agent, and a diffusing agent are also fed into the hopper of the foaming extrusion machine for performing the uniform mixing and foaming processes;

wherein, when a process temperature at a section prior to the T-die head is around 270° C., the temperature of front stage at the exit end of the T-die head is between 240~250° ° C.;

the nucleating agent contains at least one of the following: calcium carbonate, and silicon dioxide; a weight percentage of the nucleating agent is between 0.01%-0.5%;

the at least one light color conversion material comprises at least one of the following: organic dye and inorganic phosphor;

the diffusing agent includes diffusing particles composed of at least one of the following: calcium carbonate, silicon dioxide, titanium dioxide, silicone resin particles, and polymethyl methacrylate particles; wherein, a weight percentage of the diffusing agent is 0.1%-10%.

3. The manufacturing method of claim 1, wherein, the at least one light color conversion material includes two organic dyes with different light-emission wavelengths, one of which has an emission wavelength of 520-530 nm, and the other organic dye has an emission wavelength of 620-630 nm; an addition ratio (weight percentage) of the organic dye is between 0.01%-0.5%.

4. The manufacturing method of claim 1, wherein, a weight-reduction ratio of the plurality of micro-bubbles to the plastic substrate is between 15-25%; a formula for calculating the weight-reduction ratio is:

$$\text{weight-reduction ratio } (\%) = (W1 - W2)/W2 * 100\%$$

$$W1 = H * (L1 * L2 * D)$$

wherein:

H is the average thickness of the plastic substrate (mm);

L1 is the length of the plastic substrate (mm);

L2 is the width of the plastic substrate (mm);

D is the density of raw material of the plastic substrate (g/mm$^3$);

W1 is the theoretical weight (g) of the plastic substrate, that is, the weight without the micro-bubbles;

W2 is the actual weight (g) of the plastic substrate, that is, the actual weight of the plastic substrate containing the micro-bubbles that is actually weighed with a scale.

5. The manufacturing method of claim 1, wherein, a thickness of the plastic substrate is in a range of 0.2 mm~2.0 mm; a micro-structure layer is formed on a light-output surface of the plastic substrate; a plurality of micro-structures composed of convex parts or concave parts is formed on an upper surface of the micro-structure layer; the micro-structures are shaped like one of the following: semi-spherical, irregular rough matte, amoeba, and pyramid; a light-input surface of the plastic substrate is either a mirror surface that is smooth or formed with another micro-structure layer.

6. The manufacturing method of claim 1, wherein, the base material of the plastic substrate is an amorphous or semi-crystalline plastic material, which comprises at least one of the following: polycarbonate (PC), polystyrene, polymethyl methacrylate (PMMA), polyethylene, polypropylene, and polyethylene terephthalate (PET).

* * * * *